(12) United States Patent  
Tapper

(10) Patent No.: US 7,035,800 B2  
(45) Date of Patent: Apr. 25, 2006

(54) METHOD FOR ENTERING CHARACTERS

(75) Inventor: Paul Michael Tapper, Guildford (GB)

(73) Assignee: Canon Kabushiki Kaisha, Tokyo (JP)

( * ) Notice: Subject to any disclaimer, the term of this patent is extended or adjusted under 35 U.S.C. 154(b) by 981 days.

(21) Appl. No.: 09/878,211

(22) Filed: Jun. 12, 2001

(65) Prior Publication Data

US 2002/0026312 A1  Feb. 28, 2002

(30) Foreign Application Priority Data

Jul. 20, 2000 (GB) .................... 0017887

(51) Int. Cl.  
*G10L 15/04* (2006.01)
(52) U.S. Cl. ............ 704/254; 704/251; 704/270; 704/275; 704/231; 704/201
(58) Field of Classification Search ........... 704/251, 704/270–275, 231, 201, 254, 269, 1, 10, 704/200, 235, 252, 260; 379/110.01; 715/535; 382/218, 310, 204  
See application file for complete search history.

(56) References Cited

U.S. PATENT DOCUMENTS

| | | | | |
|---|---|---|---|---|
| 4,837,842 A | * | 6/1989 | Holt | 382/204 |
| 4,914,704 A | * | 4/1990 | Cole et al. | 704/235 |
| 5,208,897 A | * | 5/1993 | Hutchins | 704/200 |
| 5,210,689 A | * | 5/1993 | Baker et al. | 704/1 |
| 5,319,552 A | * | 6/1994 | Zhong | 715/535 |
| 5,781,887 A | | 7/1998 | Juang | 704/275 |
| 5,841,901 A | * | 11/1998 | Arai et al. | 382/187 |
| 5,857,099 A | * | 1/1999 | Mitchell et al. | 704/235 |
| 5,870,702 A | * | 2/1999 | Yamabana | 704/10 |
| 5,960,395 A | | 9/1999 | Tzirkel-Hancock | 704/241 |
| 6,104,381 A | * | 8/2000 | Watanabe et al. | 345/160 |
| 6,169,789 B1 | * | 1/2001 | Rao et al. | 379/110.01 |
| 6,205,261 B1 | * | 3/2001 | Goldberg | 382/310 |
| 6,223,158 B1 | * | 4/2001 | Goldberg | 704/252 |
| 6,275,612 B1 | * | 8/2001 | Imoto | 382/189 |
| 6,438,523 B1 | * | 8/2002 | Oberteuffer et al. | 704/270 |
| 6,782,131 B1 | * | 8/2004 | Anderson | 382/218 |

FOREIGN PATENT DOCUMENTS

GB    2 098 773 A    11/1982

* cited by examiner

*Primary Examiner*—Vijay Chawan  
(74) *Attorney, Agent, or Firm*—Fitzpatrick, Cella, Harper & Scinto

(57) ABSTRACT

The invention concerns a voice-activated data input signal representing a character, means for processing the received speech signal and for comparing the processed speech signal with a stored library of characters in order to allot a character from the library to the input speech signal.

16 Claims, 5 Drawing Sheets

FLOW DIAGRAM

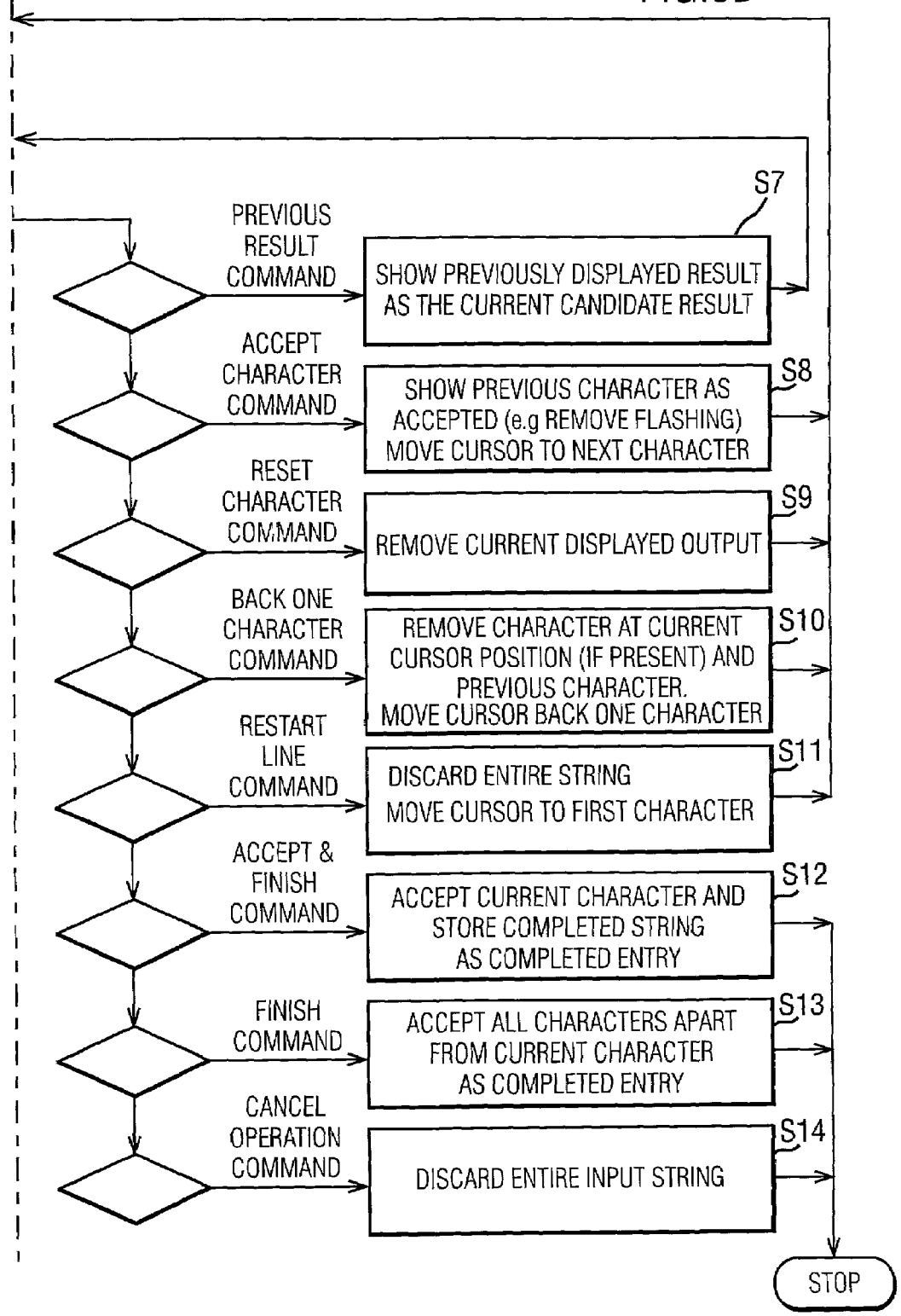

METHOD FOR ENTERING CHARACTERS

BACKGROUND OF THE INVENTION

1. Field of the Invention

The present invention concerns data input and is particularly, though not exclusively, concerned with devices which have a very limited number of keys.

2. Description of Related Art

With the increasing miniaturisation of electronic devices it has become increasingly difficult to provide full keyboards in the available space.

A typical example of such a device would be a mobile phone. Another example is the Home-Fax (TM) manufactured by Canon Inc which can store names and associated phone numbers in a "phonebook" memory. In such a device entering text and numbers is a relatively complex operation because of the limited key-set available.

Thus many small devices without a keyboard would benefit from the ability to enter text and digits by voice. However, the replacement of key operated entry of names and numbers by a speech recognition interface raises a number of difficulties which are made worse when the devices are intended to be both small and relatively inexpensive.

Firstly the audio quality on such devices may be low. There are several reasons for this. Obviously in an inexpensive device cost is a limiting factor. Additionally on a mobile phone the background noise may be loud. For example the user could be on a train. Additionally the environment is likely to be different each time the device is used making accurate modelling of the noise characteristics difficult. Where a hands-free microphone is used the distance between the user and the microphone may limit the device's ability to reject background noise. Since the purpose of having a speech interface is to simplify a task that is carried out relatively infrequently it may not be acceptable to require a user to go through a training procedure. Thus another difficulty is that a speaker independent solution may be required. Furthermore, the device may also be used by several users again making a completely speaker independent solution preferable.

Yet another problem of inexpensive devices is that the processing capabilities available on the device may be limited by cost, battery life requirements and other factors such as its physical size. Thus as well as the complexity of the calculations that may be performed as part of the recognition algorithm being limited, the amount of working memory may also be limited as may the amount of pre-calculated data available to the program.

For the above reasons a speech interface for entering small amounts of text on a consumer device is a difficult task and recognition accuracy is likely to be low.

SUMMARY OF THE INVENTION

A concern of the present invention is to provide an efficient user interface which can make the best use of the results from a recognition engine of limited accuracy, with a view to overcoming the above-noted problems.

According to the present invention, the user can correct an error made by the speech recogniser by repeating the character to be recognised.

In successive attempts at recognising characters input by a user, information from previous recognition attempts can be utilized by the recognition engine.

In accordance with an embodiment of the present invention there is provided a data input system including means for receiving an input speech signal representing a character, means for processing the received speech signal and for comparing the processed speech signal with a stored library of characters in order to allot a character from the library to the input speech signal, means for displaying the allotted character as a candidate character, and means responsive to another input from a user of the device to store the displayed character as part of a retrievable data stream. If the user decides that the displayed character does not correspond to the initial input speech signal, a repetition of the input speech signal by the user in the absence of a selection input causes the processing and displaying means to display another candidate character from the stored library, which is different from the previously displayed character. This process is repeatable until a selection input from the user selects a displayed character as a correct character.

A candidate character may be displayed in a manner differentiating it from previously selected character(s).

A candidate character may be selected by uttering a specified keyword or executing a specified keystroke. The confidence level required for recognition of the keyword or keystroke may be set higher than that required for recognition of characters.

BRIEF DESCRIPTION OF THE DRAWINGS

In order that the present invention may be more readily understood an embodiment thereof will now be described by way of example and with reference to the accompanying drawings in which.

DETAILED DESCRIPTION OF THE PREFERRED EMBODIMENTS

Figure 1:
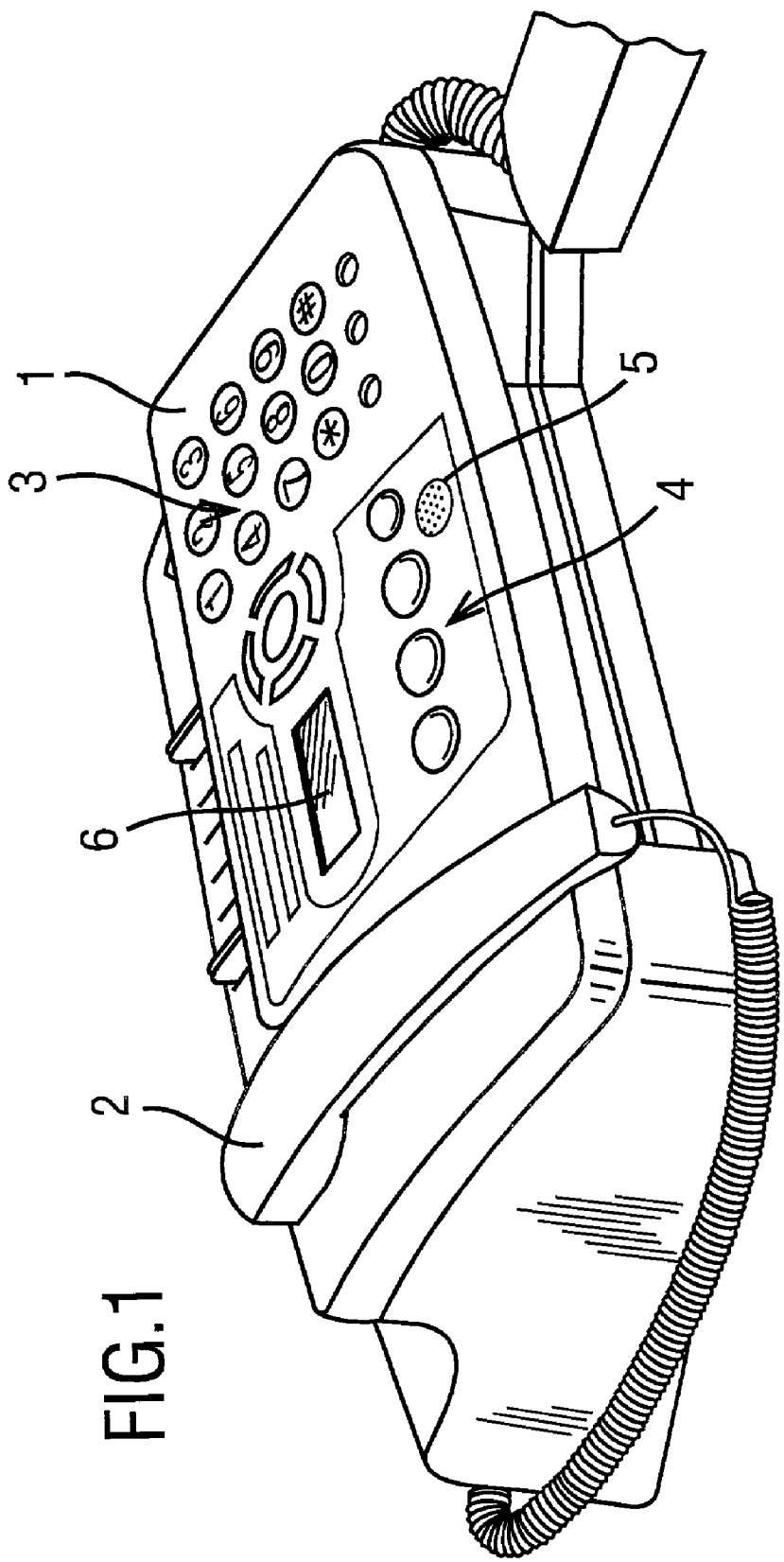
FIG. 1 is a perspective view of a desk-top fax system.

Referring now to FIG. 1 of the accompanying drawings this shows a Home-Fax system having a main casing indicated at 1 and a telephone handset 2. In the present embodiment there is provided a numeric keypad 3 having push buttons representing the ten integers 0 to 9 together with * and # inputs making a total of twelve buttons. The main body also carries other inputs such as mode select switches and ON/OFF buttons. These are generally indicated at 4. The fax shown in FIG. 1 is capable of storing for example 100 telephone numbers and the names associated with those numbers. In order to alleviate the problems already discussed concerning manual input with a limited keyboard the fax includes a simple microphone indicated at 5 and a liquid crystal alpha numeric display shown at 6.

The apparatus employs a speech recognition algorithm.

Having appropriately switched the machine so that it is ready to accept speech input the user says a letter, syllable or digit which is to be entered in the fax memory. Such an input will hereinafter be referred to as a character. The speech recognition interface analyses the speech input and displays a candidate character in response to the speech input. The current input is highlighted on the display 6 as representing the latest result. This differentiates the current input from any other characters which may be displayed. This can be done in any one of a number of appropriate ways. For example the candidate character can be displayed with a cursor beneath it, or as a flashing display or with an inverted colour. Of course any other method of highlighting can be used.

If the display result is incorrect the user merely repeats the original digit. The speech recognition interface then updates the display. The new result is calculated with the prior knowledge that the previously displayed result was incorrect. It is also possible in a variation to utilise the previous speech which had been input.

On the other hand, if the candidate character was correct or the repeated digit was then correctly identified the user can either say a keyword or press an appropriate key in order to indicate that the candidate character is the required character. Having selected the character, and if data entry has been completed the user may now say another keyword or again press a key indicating that data entry is over so as to store the displayed string of characters for subsequent use. Alternatively if another letter, syllable or digit is to be entered the user continues by saying it.

The above steps represent in general the normal mode of operation of the algorithm.

In addition to these fundamental features the algorithm may include a number of other features which can be used to control the process. These may include:

Firstly, a keyword or key-press to cancel the whole operation;

Secondly, a keyword or key-press to restart entering the current item from the beginning. The item could be the current word, phone number, line of text etc;

Thirdly a keyword or key-press to go back to the previous character and start entering this character again;

Fourthly a keyword or key-press to indicate that the process of entering the current character should be restarted. One reason for doing this would be that the user has mistakenly corrected the desired character;

Fifthly a keyword or key-press to go back to the previous result displayed for the current character. Again this would be done if the current character had been mistakenly replaced with a new character;

Sixthly a keyword or key-press both to accept the current character being displayed and to indicate that data entry has been completed. This procedure might be preferable than the use of two steps; and Finally a keyword or key-press to clear the current character, leaving the system in a state where either the character can be reentered or the previous characters can be accepted as the complete entry.

With regard to the above it will be assumed that the set of keywords used can be recognised with greater accuracy than the digits, syllables or letters which are to be entered. This can be achieved because the keywords can be chosen in advance to be sufficiently distinct from the remaining vocabulary. The algorithm may also require that the keywords be recognised with a higher degree of confidence as compared to the other words in the vocabulary.

Having now given a general description of the speech recognition algorithm reference will now be made to FIG. 2 of the accompanying drawings which is a block diagram of a speech recognition interface used in the embodiment of FIG. 1. Of course this speech recognition interface can be used in a wide range of other devices such as mobile phones where it is required to enter alpha-numeric data with a limited number of keys.

Figure 2:
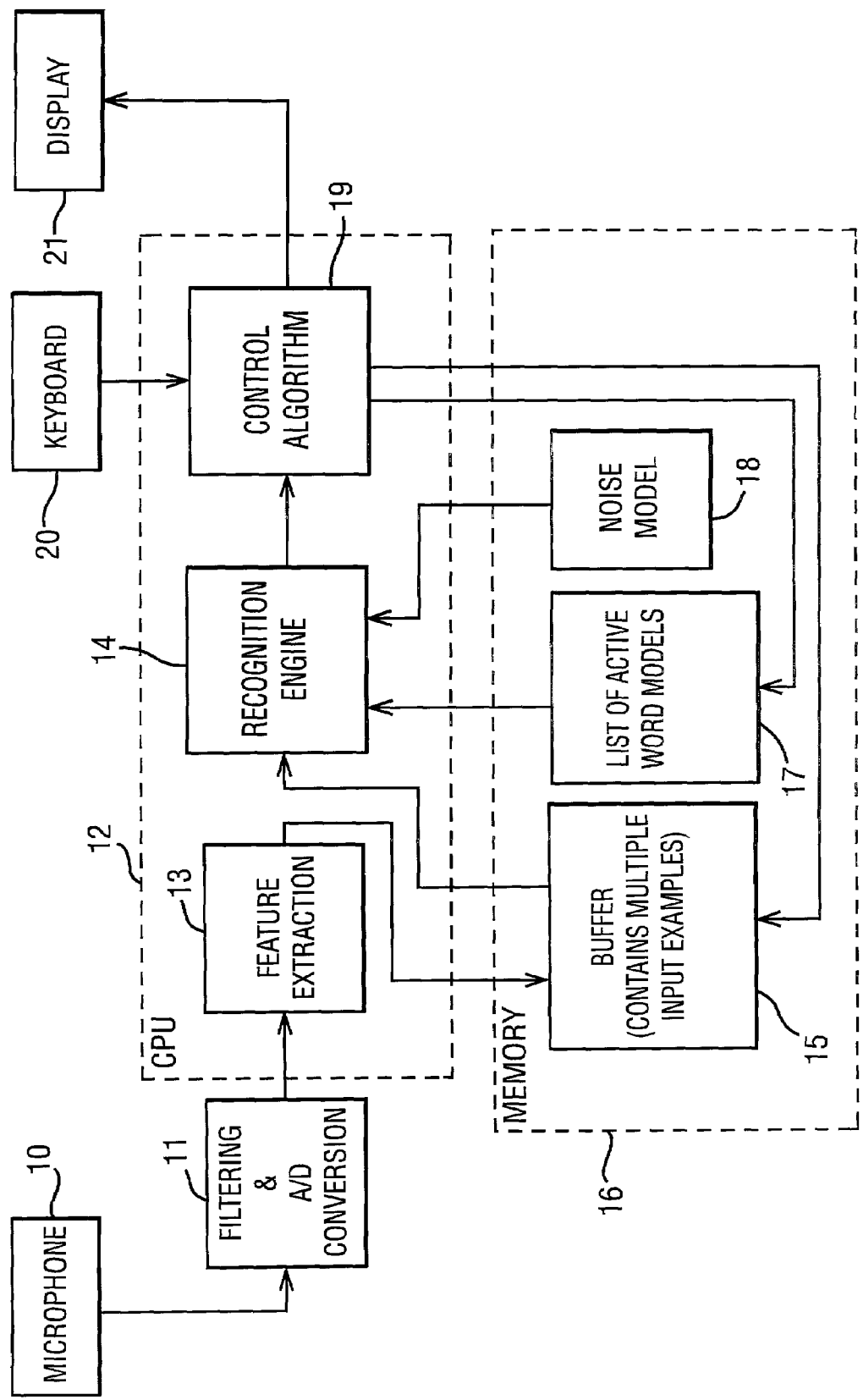
FIG. 2 is a block diagram of a voice recognition sub-system of a device.

Thus the speech recognition interface shown in FIG. 2 comprises a microphone 10 the output of which is taken to a filtering and AD conversion circuit 11 where the analog signal from the microphone is filtered to remove unwanted frequencies and converted into digital format for processing in a central processor unit indicated at 12. Most of the information useful for speech recognition is contained in the frequency band between 300 Hz and 4 Khz. Therefore, the filter portion of circuit 11 removes all frequencies outside this frequency band. Since no information which is useful for speech recognition is filtered out by the filter there is no loss of recognition performance. Further, in some environments, for example in a motor vehicle, most of the background noise is below 300 Hz and the filtering can result in an effective increase in signal-to-noise ratio of approximately 10 dB or more. The filtered speech signal is then converted into 16 bit digital samples by the analogue-to-digital component of circuit 11. To adhere to the Nyquist sampling criterion, the circuit samples the filtered signal at a rate of 8000 times per second.

In the central processor unit 12 the digitised speech is subjected to feature extraction by a feature extraction circuit 13. The concept of extracting features from input voice data and using the extracted features to match templates is well known and the number of features extracted and the degree of detail involved will depend on the computational power and memory space available. Basically the functions of the feature extraction circuit 13 are to extract the information required from the input speech and to reduce the amount of data that has to be processed in a recognition engine 14. There are many different types of information which can be extracted from the input signal. In this embodiment the feature extraction circuit 13 is designed to extract "formant" related information. Formants are defined as being the resonant frequencies of the vocal tract of the user, which change as the shape of the vocal tract changes.

The extracted features are stored in a buffer 15 which forms part of the interface memory 16. The memory 16 can be a single memory chip compartmentalised by an addressing regime or it can comprise a number of independent memory chips.

The memory 16 also includes a memory area 17 containing a list of active word models. This list will accordingly contain all keywords as well as the alpha numeric characters, symbols or digits which are to be recognised by the speech recognition interface. Finally the memory 16 also contains a storage area 18 housing data representing noise levels and spectral characteristics of the noise. This data is representative of background noise. The output of the three memory areas 15, 17 and 18 are all connected to a recognition engine 14.

It will be appreciated that because of its particular requirements the vocabulary of the present embodiment is relatively small. For example in the English language there are 10 digits and 26 letters. These will have to be supplemented by the chosen keywords. Japanese, for example requires nearer 110 characters.

As with the feature extraction section of the speech recognition interface the operation of the recognition engine in comparing the extracted features with the list of active word models is entirely conventional.

In a preferred embodiment all previous speech input examples from buffer 15 are used to generate the new result having temporarily removed all known incorrect results from the vocabulary as already described. Thus in this preferred embodiment, when an utterance by the user is run through the speech recognition interface this generates a score for each word remaining in the vocabulary and for each previous utterance. In the simplest case the scores for each word remaining in the vocabulary, from all input examples are added. The word which ends up with the best score becomes the next recognition result. More complex alternatives for combining the scores include taking the median value, discarding the words value for each word and then adding the remaining values and so on.

The results of the operation of the recognition engine 14 are supplied to the control algorithm section 19. The detailed operation of the control algorithm section 19 will be described in greater detail in the subsequent description of the flow diagram of FIG. 3.

A keyboard 20 is connected to the control algorithm section and the latter is in turn connected to a display 21 and to the buffer area 15 of memory 16 and the list of active word models area 17 of memory 16. As will be appreciated the microphone, keyboard and display corresponds to the similar units as those shown on the embodiment of FIG. 1.

Figure 3:
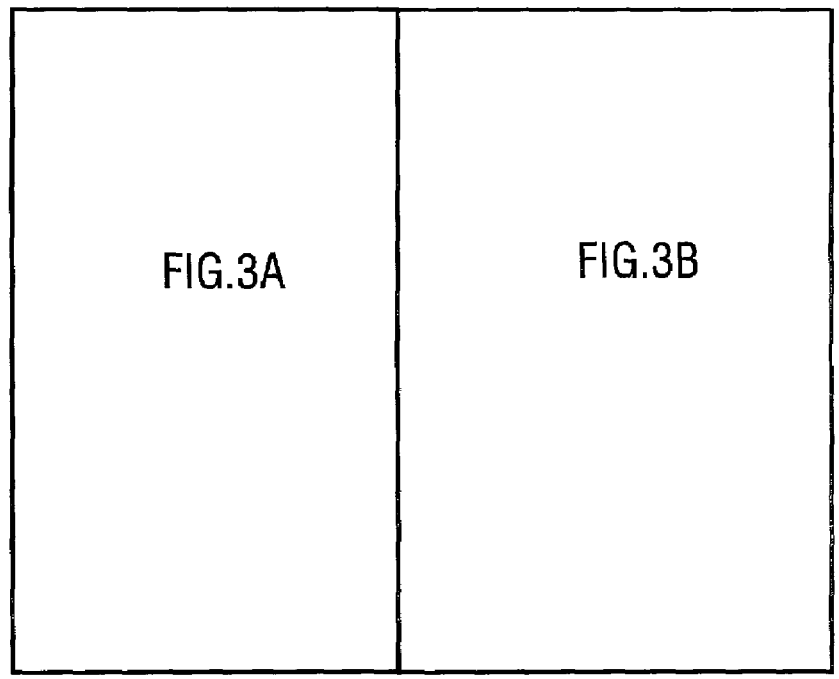
FIG. 3 is a flow diagram setting out the basic steps of the operation of the block diagram shown in FIG. 2.

Turning now to the flow diagram of FIG. 3 this starts at step S1 with a reset step in which buffer 15 is cleared and the list of active word models in memory area 17 is reset so that all active words are present in the memory area 17.

At step S2 speech recognition is carried out in response to audio input. As already described the recognition engine 14 may make use of all previous inputs for the current character. Step S3 is a decision step where it is decided whether the output of the recognition engine is a recognised digit or a recognised keyword or an equivalent keyboard input has occurred.

If a digit has been recognised the algorithm proceeds to step S4 where the recognised digit is displayed on the display as a candidate character. Again as described this displayed character is distinguishable from the others as its correctness has not yet been confirmed. In step S5 the digit just recognised is removed from the list of active word models being used in the recognition process and in step S6 the data used for recognition of the digit is stored. The stored data could be the raw digitised audio data or the extracted features used by the recognition engine.

If the displayed candidate character is correct the user indicates this, as previously described, with a keyword or by an appropriate keystroke. If it is not the user indicates this by repeating the audio input. The recognition engine repeats the recognition procedure but of course because of step S5 cannot identify the newly input audio data with the discarded character.

Once an input digit has been correctly identified as already described the recognition procedure is then continued for the next input character via steps S2, S3, S4, S5 and S6 until the recognition engine recognises a keyword or equivalent keyboard input which does not represent a digit to be recognised. In such a case the B path of the flow diagram is followed. The first option on this path is step S7 in which the previously displayed result is displayed as the current candidate result. The purpose of this step is to ensure that a user can return to a previous character if for any reason this character has been by-passed. Step S8 follows if the user accepts a display digit. In this step the highlighting of the previously provisional digit is removed and the cursor is moved to the next character. Step S9 represents the situation if the user has requested a reset of a character by an appropriate keystroke or keyword. In this step the currently displayed output is removed. At step S10 the interface responds to a "back one character" command input via an appropriate keystroke and an appropriate keyword and acts to remove the character at the current cursor position (if present) and move the cursor on the display back one character and also remove that character for possible re-entry. Step S11 occurs in response to a restart line command and in this step the entire string displayed is discarded and the cursor is moved to the first character position of the display so that a new string can be started.

The final three steps do not involve the operation of the recognition engine with step S12 responding to an accept and finish command to accept the currently displayed character and store the completed string as a completed entry.

Step S13 is the equivalent of step S12 except that all characters apart from the current character are stored as a completed entry. Finally S14 is a response to a cancel operation command in which the entire string which had previously been input is discarded.

The system just described has a number of advantages in that successive attempts at recognising each character can use all the information from previous recognition attempts. For example the previous results can be taken out of the vocabulary and the previous speech inputs and the new input fed to the recognition engine. Even with very inaccurate recognition engines the process is guaranteed to produce the correct result eventually as incorrect results are gradually eliminated, starting with the ones which are most likely to be confused. Additionally the process of correcting an error is extremely simple in that the user has only to repeat the digit to be recognised. Finally by making the correction process part of the normal process of entering a character the user is not left with the impression that the device is failing to perform.

It will be appreciated that the overhead of having to accept each character becomes more significant when recognition is good and less significant when recognition is bad. This will make differences in performance of the recognition engine less noticeable, for example when there are differing background noise levels.

What is claimed is:

1. A data input apparatus comprising:
  receiving means for receiving an input speech signal representing a character;
  comparing means for comparing the input speech signal with a stored library of characters in order to allot a character from the library to the input speech signal; and
  control means operable: i) to cause a display to display the allotted character as a candidate character; ii) responsive to a predetermined selection input, to store the displayed character; iii) responsive to a repetition of the input speech signal in the absence of the input of a predetermined selection input, to bar the previously allotted character from the library and to cause the comparing means to allot another candidate character from the remaining characters of the library, and to cause the display to display the other candidate character,
  wherein in response to a predetermined selection input, said control means is operable to reinstate for selection any characters which have been barred from the stored library.

2. An apparatus according to claim 1, wherein if the user has already selected at least one previous character for storage, a candidate character is displayed in a manner which is differentiated from the previous or each already selected character.

3. An apparatus according to claim 1, wherein said comparing means is operable, in response to a repetition of the input speech signal in the absence of the input of a predetermined selection input, to utilize the input speech signal for the non-selected candidate character as well as the repeated input speech signal to allot a new character from the library to the input speech signal.

4. An apparatus according to claim 1, wherein the library is adapted to store a plurality of alpha-numeric characters.

5. An apparatus according to claim 1, wherein the predetermined selection input corresponds to the utterance of a specified keyword.

6. An apparatus according to claim 5, wherein a confidence level for the recognition of the keyword is higher than a confidence level required for the recognition of characters for the allocation of characters.

7. An apparatus according to claim 1, wherein the predetermined selection input corresponds to a keystroke.

8. An apparatus according to claim 1, wherein the predetermined selection input corresponds to either a keyword or a keystroke.

9. A data input method comprising:
- a receiving step of receiving an input speech signal representing a character;
- a comparing step of comparing the input speech signal with a stored library of characters in order to allot a character from the library to the input speech signal;
- a display controlling step of controlling displaying the allotted character as a candidate character;
- a first processing step of, responsive to a repetition of the input speech signal in the absence of the input of a predetermined selection input, barring the previously allotted character from the library, comparing the repeated input speech signal with the remaining characters of the library to allot another candidate character and controlling displaying the other candidate character; and
- a second processing step of, responsive to a predetermined selection input, storing the displayed character and reinstating for selection any characters which have been barred from the stored library.

10. A method according to claim 9, wherein, if the user has already selected at least one previous character for storage, a candidate character is displayed in a manner which is differentiated from the previous or each already selected character.

11. A method according to claim 9, wherein said comparing step is operable, in response to a repetition of the input speech signal in the absence of the input of a predetermined selection input, to utilize the input speech signal for the non-selected candidate character as well as the repeated input speech signal to allot a new character from the library to the input speech signal.

12. A method according to claim 9, wherein the library is adapted to store a plurality of alpha-numeric characters.

13. A method according to claim 9, wherein the predetermined selection input corresponds to the utterance of a specified keyword.

14. A method according to claim 13, wherein a confidence level for the recognition of the keyword is higher than a confidence level required for the recognition of characters for the allocation of characters.

15. A method according to claim 9, wherein the predetermined selection input corresponds to a keystroke.

16. A method according to claim 9, wherein the predetermined selection input corresponds to either a keyword or a keystroke.

* * * * *

UNITED STATES PATENT AND TRADEMARK OFFICE
CERTIFICATE OF CORRECTION

| | | |
|---|---|---|
| PATENT NO. | : 7,035,800 B2 | Page 1 of 1 |
| APPLICATION NO. | : 09/878211 | |
| DATED | : April 25, 2006 | |
| INVENTOR(S) | : Paul Michael Tapper | |

Figure 3A:
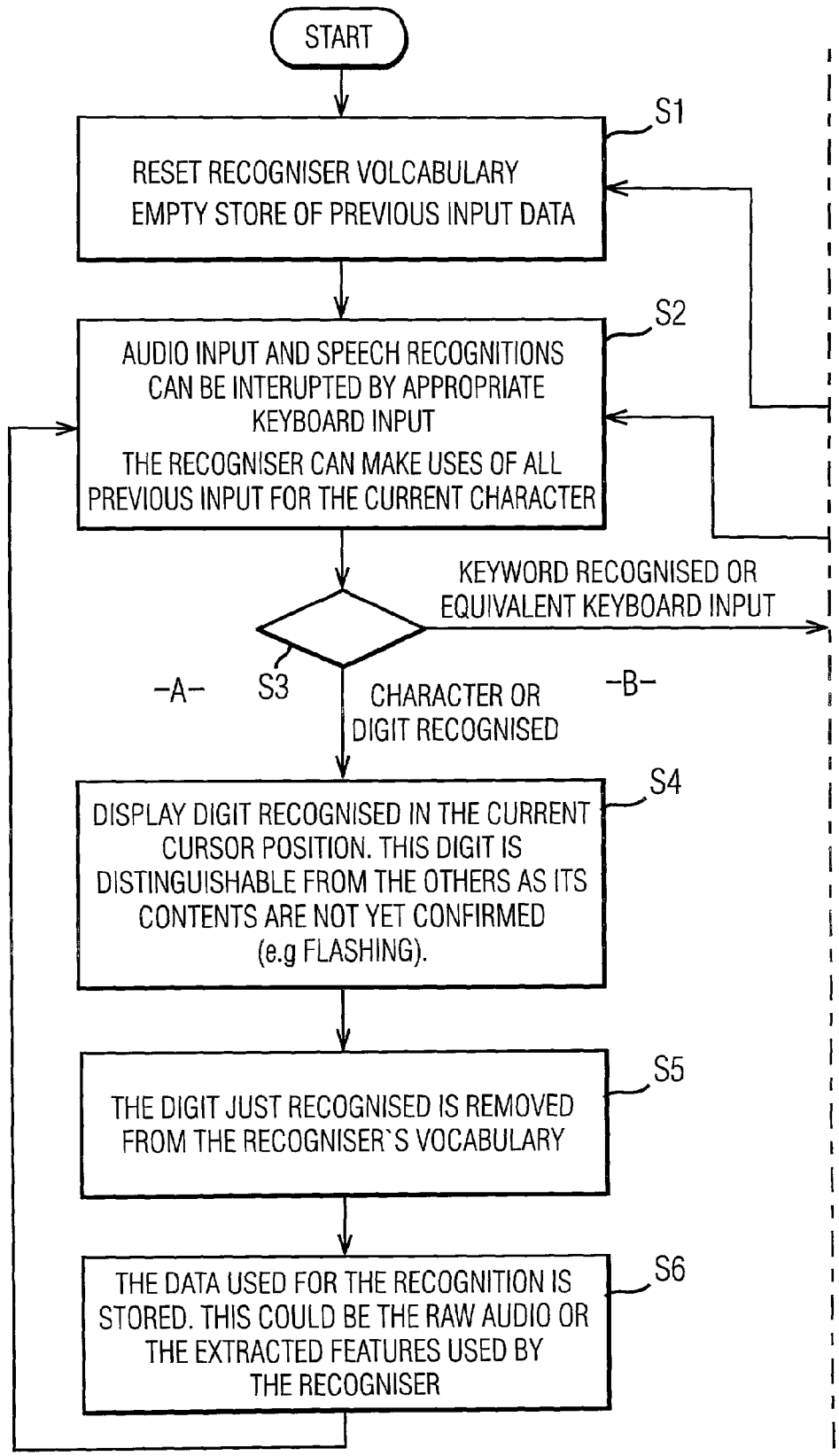

It is certified that error appears in the above-identified patent and that said Letters Patent is hereby corrected as shown below:

IN THE DRAWINGS
Sheet 4, FIG. 3A, step S1, "VOLCABULARY" should read --VOCABULARY--.

Sheet 4, FIG. 3A, step S2, "INTERUPTED" should read --INTERRUPTED--.

Signed and Sealed this

Twenty-fifth Day of December, 2007

JON W. DUDAS
*Director of the United States Patent and Trademark Office*